May 7, 1946.  A. L. COGER  2,399,856
MAGNETIC METER DRIVE
Filed May 12, 1944
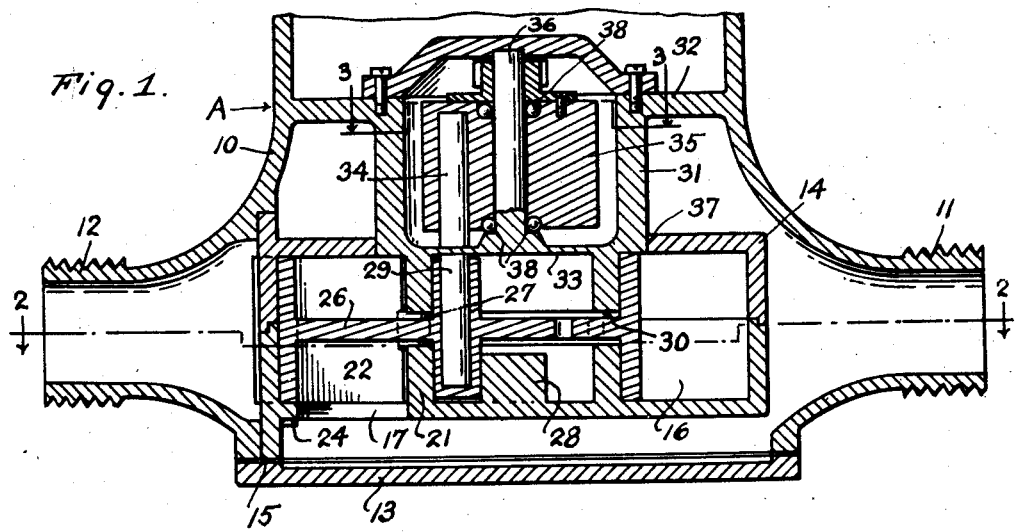
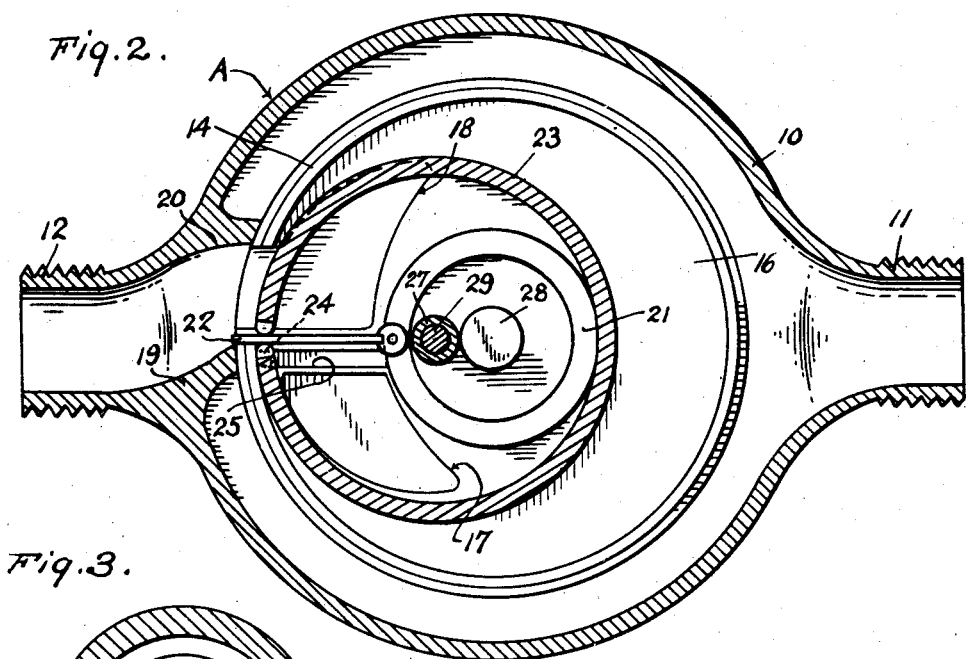
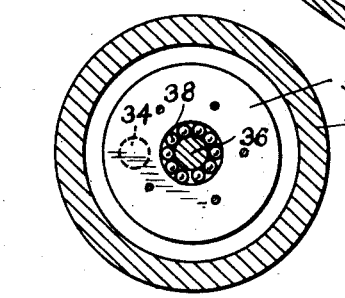
INVENTOR.
Arlis L. Coger
BY
Victor J. Evans & Co.
ATTORNEYS Patented May 7, 1946

2,399,856

UNITED STATES PATENT OFFICE 2,399,856

MAGNETIC METER DRIVE

Arlis L. Coger, Huntsville, Ark.

Application May 12, 1944, Serial No. 535,372

3 Claims. (Cl. 73—257)

The invention relates to a meter driving mechanism, and more particularly to magnetic meter drive device.

The primary object of the invention is the provision of a device of this character, wherein the motion of the driving mechanism is transmitted to the indicating mechanism through a magnetic coupling, which is confined away from the course of water, where such mechanism is used in a water meter, thus avoiding any damage resultant from water or moisture contact with the said mechanism.

Another object of the invention is the provision of a device of this character, wherein the construction thereof is entirely novel and assures a perfect working of the meter in that its mechanism can be sealed so that no moisture can enter and condense on the glass to prevent easy reading of the indicator mechanism, the device being usable with all kinds of measuring devices of the reading meter types.

A further object of the invention is the provision of a device of this character, wherein the unique set-up enables the use of permanent magnets and the stuffing boxes employed in the present day meters, are eliminated, and moisture is entirely excluded from the driving and indicator mechanism in association with each other.

A still further object of the invention is the provision of a device of this character, which is simple in construction, thoroughly reliable and efficient in operation, strong, durable, easy of operation, assures perfect coupling between the driving and indicating mechanisms of meters, and inexpensive to manufacture and install.

With these and other objects in view the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawing:

Figure 1 is a vertical longitudinal sectional view through the driving mechanism of a meter showing the device constructed in accordance with the invention installed therewith.

Figure 2 is a sectional view taken on the line 2—2 of Figure 1 looking in the direction of the arrows.

Figure 3 is a sectional view showing the bearing set-up in the coupling.

Similar reference characters indicate corresponding parts throughout the several views in the drawing.

Referring to the drawing in detail A denotes generally in a fragmentary way the cylindrical meter casing, having a body 10 made of non-magnetic material, provided peripherially thereof at diametrically opposite sides with inlet and outlet nipples 11 and 12, respectively, for the inflow and outflow of water or other fluid, in this instance. The body has a removable cover plate 13 for giving access to the interior thereof, the plate being sealed thereto in any desirable manner, as well as removably secured in such manner.

Within the body 10 is a two-part or sectional cage 14 securely seated at 15 within said body and constituting a measuring chamber 16 of cylindrical form for fluid, the latter being admitted thereto through an opening 17 therein from the inlet 11 and discharged therefrom through an opening 18 therein directly to the outlet 12. The outlet 12 has the walls 19 and 20, respectively in association with this opening 18 to prevent return flow of fluid to the inlet 11.

The cage 14 is provided with a central abutment 21 and a division plate or bridge piece 22, separating the inlet opening 17 on one side and the outlet opening 18 on the other side.

Within the cage 14 is a balanced piston 23, which does not rotate, but glides or oscillates back and forth with its path of motion controlled by a piston pilot 24, always moving, however, in the same direction in which the water flows, this pilot 24 being movably engaged in a slot 25 in the cage 14. The piston has a horizontal web 26 carrying a socketed post 27 in the center, and is slotted to clear the division plate 22. The post 27, extending below the web 26, guides the piston 23 within the measuring chamber 16 around a circular stud 28 in the lower abutment wall.

The post 27 extends above the web 26 and has fitted in its upper open end for filling the socket in the said post, a permanent magnet 29 for travel with the piston 23. An upper well 30 is created for the post 27 by a bonnet extension 31 integral with and depending from a cross partition 32 in the upper portion of the casing 10, this extension 31 being formed with a thin floor 33 with which contacts the magnet 29, and also a magnet 34 fitting within a rotor 35, rotating on an axle 36. The axle 36 rises from the floor 33, and this rotor 35 is the driving element for indicating mechanism not shown of the meter. The magnet 34 is eccentrically fitted into the rotor, while the magnet 29 is centrally of the piston, so that the attraction of these magnets 29 and 34 effects a magnetic coupling between the driving mechanism and the indicating mechanism of the meter.

The bonnet extension 31 has a fluid tight or fluid seal connection at 37 between the same and the cage 14 so that no moisture or fluid can make contact with the rotor and adjunct parts of the indicating mechanism of the meter.

The openings 17 and 18 are such that, although they continually change in area, they are always open so that water or fluid has a free flow through the meter at all times. The displacing action of the piston 29 continues as long as fluid is passing through the meter.

The rotor 35 and the axle 36 are fitted with anti-friction bearings 38 and the division plate 22 is held securely in place by spring pressure not shown without the use of screws or solder, and such plate 22 is of uniform thickness. The pressure on both sides of the web is equalized resulting in a piston that practically glides between the top and bottom half of the chamber with minimum friction and wear.

It is of course understood that the magnetic coupling is useable with all types of meters and this is contemplated within the scope of the present invention, as fall properly within the terms of the claims hereunto annexed.

What is claimed is:

1. A fluid meter having magnetic coupling for fluid driving mechanism and indicating mechanism of a meter, comprising a casing made of non-magnetic material, a sectional cage securely seated within said casing and forming a measuring chamber, a cross partition formed in said casing, having a bonnet extension formed integral therein and depending therefrom, opposed permanent magnets, said extension being formed with a thin floor separating said opposed permanent magnets, a rotor for the indicating mechanism and having one of the magnets disposed eccentrically therein and adapted to be attracted by the other magnet, and a balanced piston gliding oscillatingly in the measuring chamber and having the other magnet for travel in the path of the rotor magnet for attracting it thereto and operating the rotor with said piston in its movement.

2. A fluid meter having magnetic coupling for fluid driving mechanism and indicating mechanism of a meter, comprising a casing made of non-magnetic material, a sectional cage securely seated within said casing and forming a measuring chamber, a cross partition formed in said casing, having a bonnet extension formed integral therein and depending therefrom, opposed permanent magnets, said extension being formed with a thin floor separating said opposed permanent magnets, a rotor for the indicating mechanism and having one of the magnets disposed eccentrically therein and adapted to be attracted by the other magnet, a balanced piston gliding oscillatingly in the measuring chamber and having the other magnet for travel in the path of the rotor magnet for attracting it thereto and operating the rotor with said piston in its movement, said cage having inlet and outlet openings for the fluid separated from each other.

3. A fluid meter having magnetic coupling for fluid driving mechanism and indicating mechanism of a meter, comprising a casing made of non-magnetic material, a sectional cage securely seated within said casing and forming a measuring chamber, a cross partition formed in said casing, having a bonnet extension formed integral therein and depending therefrom, opposed permanent magnets, said extension being formed with a thin floor separating said opposed permanent magnets, a rotor for the indicating mechanism and having one of the magnets disposed eccentrically therein and adapted to be attracted by the other magnet, a balanced piston gliding oscillatingly in the measuring chamber and having the other magnet for travel in the path of the rotor magnet for attracting it thereto and operating the rotor with said piston in its movement, said cage having inlet and outlet openings for the fluid separated from each other, and a division plate between the openings in the cage.

ARLIS L. COGER.